United States Patent Office 3,382,197
Patented May 7, 1968

3,382,197
FIBREBOARD CONTAINING A COPOLYMER BINDER OF OXAZOLINE OIL AND A VINYL MONOMER
Robert F. Purcell, Terre Haute, Ind., assignor to Commercial Solvents Corporation, a corporation of Maryland
No Drawing. Filed July 16, 1964, Ser. No. 383,236
13 Claims. (Cl. 260—17.4)

ABSTRACT OF THE DISCLOSURE

Artificial boards and a process for making them which comprises heating and pressing a mixture of a polymerizable binder composition and a cellulosic filler material at a temperature sufficient to copolymerize the polymerizable binder composition, wherein the polymerizable binder composition is a mixture of from about 30 to 90%, based on the weight of oxazoline oil and vinyl monomer, of an oxazoline oil having the general formula:

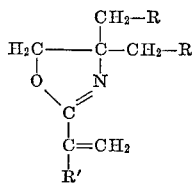

in which R is the radical:

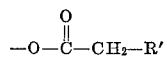

or lower alkyl, hydroxy, rosin acid radical or hydrogen; and R' is hydrogen or alkyl or alkenyl radicals having from 1 to about 25 carbon atoms; about 70 to 10% of a vinyl monomer copolymerizable with the oxazoline oil; about 0.1 to 10%, based on the weight of the vinyl monomer, of a free-radical polymerization catalyst; and about 0.01 to 2%, based on the weight of the oxazoline oil, of metal from a metal drier.

---

This invention relates to improvements in artificial boards produced from a cellulose or lignocellulose filler and a resin by bonding with heat and pressure.

In the past, resins for use in bonding cellulosic fillers have been prepared, for example, from urea and formaldehyde in the presence of a basic catalyst to prepare the resin and an acid catalyst to cure the resin. The molded shapes produced with these prior resins, when combined with the cellulose or lignocellulose fillers under heat and pressure, however, lack sufficient strength when weathered in comparison with commercial materials such as Masonite. Additionally, the shapes lack sufficient water resistance for many uses.

A primary object of this invention is to provide an inexpensive artificial board utilizing an improved binder, which board has superior strength and is also relatively water resistant. Artificial boards produced in accordance with the present invention may be molded as desired and used in the production of many types of furniture, for example, as table tops.

The improved binder of the present invention con- sists essentially of an oxazoline oil-vinyl monomer mixture. The oxazoline oils have the general formula

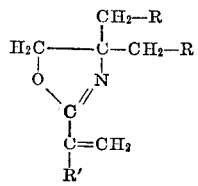

wherein R is the radical:

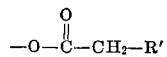

lower alkyl, hydroxy, rosin acid radical, or hydrogen; and whereing R' is hydrogen or an alkyl or alkenyl radical generally having from about 1 to 25, preferably 9 to 22, carbon atoms.

Vinyl monomers which may be used in the instant invention are advantageously those which are not excessively volatile under the conditions employed in the present process and these include acryl and alkacrylyl compounds, e.g. acrylic, haloacrylic, and methacrylic acids, esters, nitriles, and amides, amino alkyl methacrylates, vinyl aryls and other vinyl derivatives. Suitable vinyl monomers include methyl methacrylate, ethylmethacrylate, butyl methacrylate, chloroethyl methacrylate, methacrylic acid, ethyl acrylate; vinyl acetate, vinyl laurate, vinyl propionate, vinyl stearate, styrene, methyl styrene, vinyl toluene and vinyl naphthalene. Styrene is preferred.

In general, the artificial products of the invention can be produced by forming a solution of the oxazoline oil in the vinyl monomer, thoroughly mixing the solution with a cellulose filler material which is preferably completely wet with the solution and curing the mixture by heat, preferably in a press. The oxazoline oil-vinyl monomer solution generally contains from about 10% to 70% of the vinyl monomer. A mixture of equal parts of oxazoline oil and styrene provides a particularly effective binder. Since the oxazoline oil has an active, polymerizable vinyl group, the oil and monomer copolymerizable with the oil are copolymerized to form a hard durable product. A polymerization catalyst is advantageously added to the solution in polymerization amounts to initiate the polymerization. Also, the use of an activator which can be a metal drier is particularly advantageous.

Any suitable polymerization catalyst can be used. Included are the free-radical initiating catalysts such as the peroxide catalysts, e.g. ditertiary butyl peroxide, cumene peroxide, benzoyl peroxide and the like. The amount of catalyst used will vary depending upon the particular polymerizable components to be polymerized. Generally, the catalyst is used in amounts from about 0.1 to about 10% by weight based on the weight of the vinyl monomer, preferably from about 0.5 to about 6.0%.

The cellulose filler material employed in making the artificial boards of the present invention may be wood, paper, straw, corn stalks, bagasse, nut shells, and other fibers from naturally occuring and synthetic sources. A particularly suitable material is wood chips.

The oxazoline-vinyl monomer binder is advantageously added to the cellulose filler material in an amout sufficient to bind the filler material under the conditions used. Generally from about 3 to 30%, preferably from 5 to 15% by weight, of binder are used based upon the weight of the filler.

The activators which can be employed include metal soaps conventional in the art. These materials, known as driers in the paint industry, act to enhance drying of the oxazoline oils as well as to enhance free radical polymerization through the vinyl groups. Such metal soaps contain oil-soluble metals in an available form to exhibit drying action.

Suitable metals include zirconium, lead, cobalt, and the like, but preferably a lead-cobalt mixture. The metals can be provided in the form of their naphthenates, tallates, 2-ethylhexoates, linoleates and other suitable forms. Such driers can generally be used in amounts from about .01% to 2%, preferably .03 to 1%, metal based on the weight of the oxazoline oil in the solution.

The reaction conditions employed in producing the artificial boards of the present invention generally depend upon the particular components present in the solution and, when used, the catalyst. Generally, the mixture of binder and cellulose material may be cured at temperature from about 200° to 450° F. Particularly 250° to 350° F., and at superatmospheric pressures, generally from about 200 p.s.i. to 30,000 p.s.i. or more, particularly at pressures in the range of about 10,000 to 20,000 p.s.i.

The following examples serve to illustrate the invention but are not to be considered limiting.

EXAMPLE I

An oxazoline oil prepared from tall oil fatty acids (a mixture of oleic, linoleic and rosin acids), tris(hydroxymethyl)aminomethane and formaldehyde and having a rosin content of about 20% was blended with an approximately equal amount of styrene. Samples of the mixture of oxazoline oil and styrene were prepared with approximately 1% of a peroxide catalyst and with various drier combinations, e.g. cobalt naphthanate and lead naphthanate. The catalysts tested were benzoyl peroxide and cumene peroxide. The driers tested were 6% cobalt naphthanate drier (0.05% cobalt added as metal) and a mixture of 24% lead naphthanate drier and 6% cobalt naphthanate drier (0.5% lead and 0.05% cobalt added as metal).

25 grams of wood chips were thoroughly mixed with 2 gm. samples of each of the binder preparations and were placed in a mold to be heated under a pressure of about 20,000 p.s.i. to produce artificial boards. Two temperature cycles, 15 minutes at 300° F. and 20 minutes at 250° F. were used in the press.

An additional sample, excluding the binder, was run as a control. A sample was also run using only oxazoline oil without the vinyl monomer, e.g. styrene.

The artificial board samples prepared using wood chips, and a mixture of the oxazoline oil and styrene were all flexible when first removed from the mold but hardened with age. Each sample showed bonding and had good resistance to separation of individual chips. The sample prepared without the binder lacked strength. The sample containing the oxazoline oil but excluding the vinyl monomer would not cure sufficiently to be free of tack.

EXAMPLES II–IV

The procedure of Example I for preparing artificial board using styrene, oxazoline oil and wood chips is followed substituting ethyl methacrylate, methyl methacrylate, and vinyl toluene for styrene as the vinyl monomer which is copolymerized with the oxazoline oil.

EXAMPLE V

The procedure of Example I for preparing artificial board using styrene, oxazoline oil and wood chips is followed using ditertiary butyl peroxide as the catalyst and a mixture of zirconium and cobalt octoate drier in copolymerizing the styrene with the oxazoline oil.

EXAMPLE VI

The procedure of Example I for preparing artificial board using styrene, oxazoline oil and wood chips is followed using an oxazoline oil, 2-(1-hexadecylthenyl)-4,4-bis-(Stearoyloxymethyl)-2-oxazoline produced by the reaction of 1 mole of tris(hydroxymethyl)aminomethane, 3 moles of stearic acid and 1 mole of formaldehyde.

EXAMPLE VII

The procedure of Example I for preparing artificial board using styrene, oxazoline oil and wood chips is followed using an oxazoline oil, 2-(1-heptylethenyl)-4,4-bis(nonanoyloxymethyl)-2-oxazoline, produced by the reaction of 1 mole of tris(hydroxymethyl)aminomethane, 3 moles of nonanoic acid and 1 mole of formaldehyde.

EXAMPLE VIII

The procedure of Example I for preparing artificial board using styrene, oxazoline oil and wood chips is followed using an oxazoline oil produced by the reaction of 1 mole of 2-amino-2-ethyl-1,3-propanediol, 2 moles of linseed fatty acids and 1 mole of formaldehyde.

EXAMPLES IX AND X

Artificial boards are prepared following the procedure of Example I using straw, and nut shells, respectively, in place of wood chips.

EXAMPLE XI

The procedure of Example I for preparing artificial board using styrene, oxazoline oil and wood chips is followed using an oxazoline oil, 2[1(9,10-heptadecenyl)ethenyl]-4,4-dimethyl-2-oxazoline, produced by the reaction of 1 mole of 2-amino-2-methyl-1-propanol, 1 mole of oleic acid and 1 mole of formaldehyde.

The oxazoline oils employed in the process of the present invention can be prepared by reacting an amino hydroxyl compound, an organic carboxylic acid and an aldehyde at temperatures above 150° C. Suitable amino hydroxy compounds for the preparation of the oxazoline oil include tris(hydroxymethyl)aminomethane, 2-amino-2 - methyl - 1,3 - propanediol, 2 - amino - 2 ethyl - 1,3-propanediol and 2-amino-2-methyl-1-propanol, although tris(hydroxymethyl)aminomethane is preferred.

Carboxylic acids suitable for preparation of the oxazoline oil include fatty acids such as linseed fatty acids, fish oil acids, tall oil acids, mixtures of oleic and linoleic acids (i.e., unsaturated fatty acids having 18 carbon atoms), etc. Such acids may be characterized as saturated and unsaturated acids having from about 8 to 25 carbon atoms, and mixtures thereof. These acids may or may not contain such other materially occurring acids as rosin acids. Carboxylic acids having from 1 to 8 carbon atoms such as acetic acid, propionic acid, caprylic acid, etc., can also be used in addition to the fatty acids.

The preferred aldehyde for preparing the oxazoline oils is formaldehyde or formaldehyde-releasing substances such as para-formaldehyde, although any aldehyde can be used.

In general, the oxazoline oil can be produced by placing the fatty acid and amino hydroxy compound in a reaction kettle equipped with an external heating jacket, means for agitation, and providing for an inert gas sparge. These reactants are slowly heated to about 220° or 230° C. This temperature should be held for an hour or more, preferably two or three hours, to complete the reaction as indicated by a reduction of the acid number to a value less than 10. It is preferable to maintain an inert gas blanket over the reactants at all times.

The reaction product so prepared may then be cooled to around 120° C. by admitting cold liquid medium into the heating chamber. The aldehyde, in an amount of one mole aldehyde for each mole of amino alcohol charged, is then added. The mixture is heated slowly with agitation and maintaining the inert gas sparge to a temperature of about 190° C. This temperature is maintained until the reaction is complete, as evidenced by no further dehydration and a return of the acid number to the original value.

It is claimed:

1. In a process for making artificial board which comprises heating and pressing a mixture of a polymerizable binder composition and a cellulosic filler material at a temperature sufficient to copolymerize the polymerizable binder composition, the improvement wherein said composition is a mixture consisting essentially of from about 30 to 90%, based on the weight of oxazoline oil and vinyl monomer, of an oxazoline oil having the general formula:

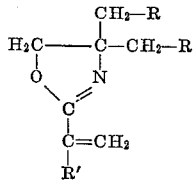

wherein R is selected from the group consisting of the radical:

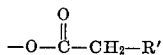

lower alkyl, hydroxy, rosin acid radical and hydrogen; and R' is selected from the group consisting of hydrogen and alkyl and alkenyl radicals having from 1 to about 25 carbon atoms; about 70 to 10% of a vinyl monomer copolymerizable with the oxazoline oil, about 0.1 to 10%, based on the weight of the vinyl monomer, of a free-radical polymerization catalyst; and about .01 to 2%, based on the weight of the oxazoline oil, of metal from a metal drier.

2. The process of claim 1 wherein said oxazoline oil is prepared by reaction of tall oil fatty acids, tris(hydroxymethyl)aminomethane and formaldehyde at temperatures above 150° C.

3. The process of claim 2 wherein said vinyl monomer is styrene.

4. The process of claim 1 wherein said catalyst is selected from the group consisting of benzoyl peroxide and cumene peroxide.

5. The process of claim 1 wherein said drier is selected from the group consisting of cobalt and lead driers and mixtures thereof.

6. An artificial board consisting essentially of a heated and compressed mixture of from about 3 to 30% by weight of a binder consisting essentially of about 30 to 90% of an oxazoline oil having the general formula:

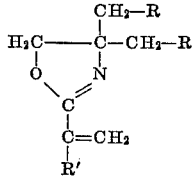

wherein R is selected from the group consisting of the radical:

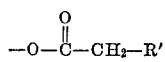

lower alkyl, hydroxy, rosin acid radical and hydrogen; and R' is selected from the group consisting of alkyl and alkenyl radicals having from 1 to about 25 carbon atoms; copolymerized with about 10 to 70% of a vinyl monomer and from about 70 to 97 weight percent of a cellulosic filler.

7. The artificial board of claim 6 wherein said oxazoline oil is produced by the reaction of tris(hydroxymethyl)-aminomethane, tall oil fatty acids and formaldehyde at temperatures above 150° C.

8. The artificial board of claim 7 wherein said vinyl monomer is styrene.

9. An artificial board according to claim 8 wherein said cellulosic filler is wood chips.

10. A process for making artificial board which comprises heating and pressing a mixture of from 3 to 30% by weight of a binder consisting essentially of about 30 to 90% of an oxazoline oil having the general formula:

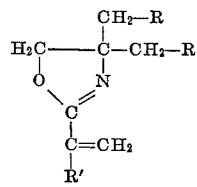

wherein R is selected from the group consisting of the radical:

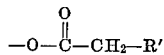

lower alkyl, hydroxy, rosin acid radical, and hydrogen; and R' is selected from the group consisting of hydrogen and alkyl and alkenyl radicals having from about 1 to about 25 carbon atoms; about 10 to 70% of a vinyl monomer, about 0.1 to 10%, based on the weight of the vinyl monomer, of a free-radical polymerization catalyst; and about .01 to 2%, based on the weight of the oxazoline oil, of metal from a metal drier; and from about 70 to 97 weight percent of a cellulosic filler, at a temperature sufficient to copolymerize the oxazoline oil and vinyl monomer.

11. The process of claim 10 wherein said temperature is in the range of 250 to 450° F.

12. The process of claim 11 wherein said vinyl monomer is styrene and said oxazoline oil is produced by the reaction of tris(hydroxymethyl)aminomethane, tall oil fatty acids and formaldehyde at temperatures above 150° C.

13. A process for making artificial board which comprises heating and pressing a mixture of from 3 to 30% by weight of a binder consisting essentially of about 30 to 90% of an oxazoline oil having the general formula:

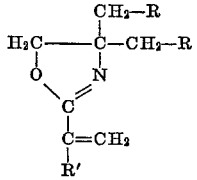

wherein R is selected from the group consisting of the radical:

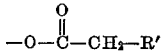

lower alkyl, hydroxy, rosin acid radical, and hydrogen; and R' is selected from the group consisting of alkyl and alkenyl radicals having from about 1 to about 25 carbon atoms; about 10 to 70% of a vinyl monomer; and from about 70 to 97 weight percent of a cellulosic filler, at a temperature sufficient to copolymerize the oxazoline oil and vinyl monomer.

References Cited

UNITED STATES PATENTS 2,255,313   9/1941   Ellis _____ 260—17.4

WILLIAM H. SHORT, *Primary Examiner.*

J. NORRIS, *Assistant Examiner.*